United States Patent [19]

Beckmann

[11] Patent Number: 4,529,212
[45] Date of Patent: Jul. 16, 1985

[54] HEAT EXCHANGER SEAL

[76] Inventor: Kenneth B. Beckmann, 5040 Enterprise Blvd., Toledo, Ohio 43612

[21] Appl. No.: 597,380

[22] Filed: Apr. 6, 1984

[51] Int. Cl.³ .............................................. F16J 15/10
[52] U.S. Cl. .............................. 277/207 A; 277/212 F
[58] Field of Search ......................... 277/212 F, 207 A

[56] References Cited

U.S. PATENT DOCUMENTS

| | | | |
|---|---|---|---|
| 3,260,540 | 7/1966 | Houot | 277/207 A |
| 4,007,941 | 2/1977 | Stancati | 277/207 A |
| 4,159,829 | 7/1979 | Ditcher | 277/207 A |
| 4,186,931 | 2/1980 | Anderson | 277/207 A |

Primary Examiner—Robert I. Smith
Attorney, Agent, or Firm—Emch, Schaffer & Schaub Co.

[57] ABSTRACT

A seal is disclosed having a member of castable material. The member has a first surface and a second surface, and at least one aperture formed in the member during the casting of the member. A seal is positioned in the aperture in the member. The seal is positioned in the aperture during the casting of the member whereby the seal is secured to the member of castable material and forms a fluid tight joint with the first surface of the member.

17 Claims, 3 Drawing Figures

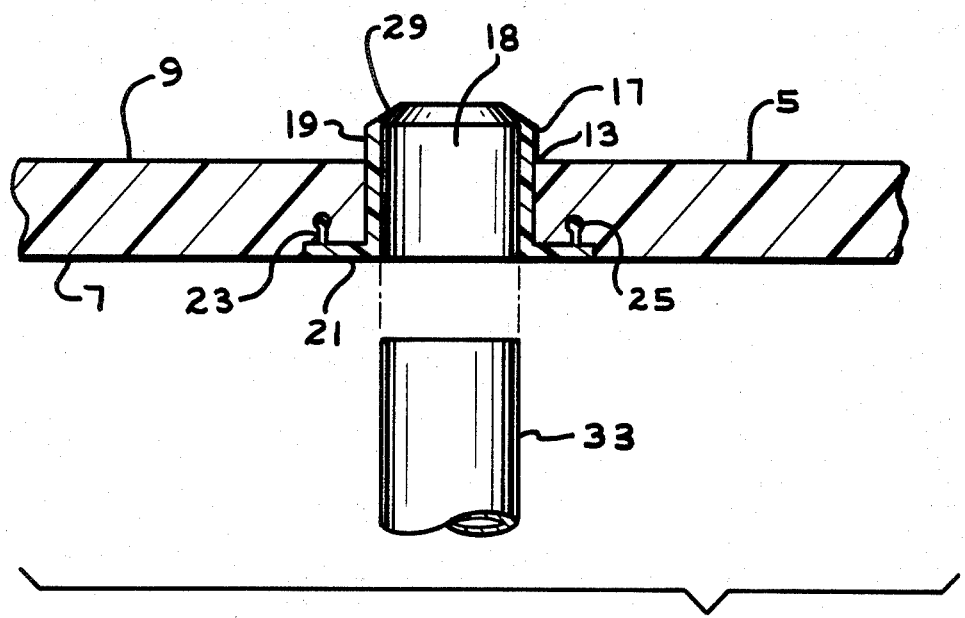
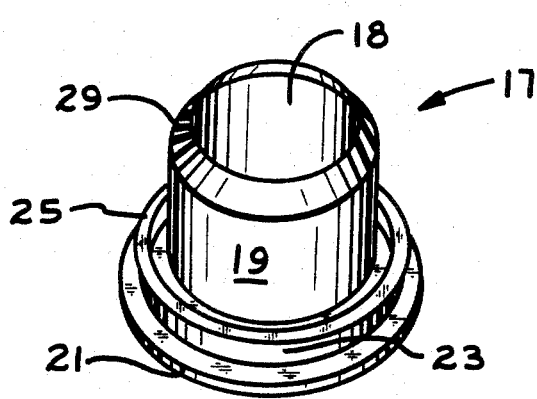
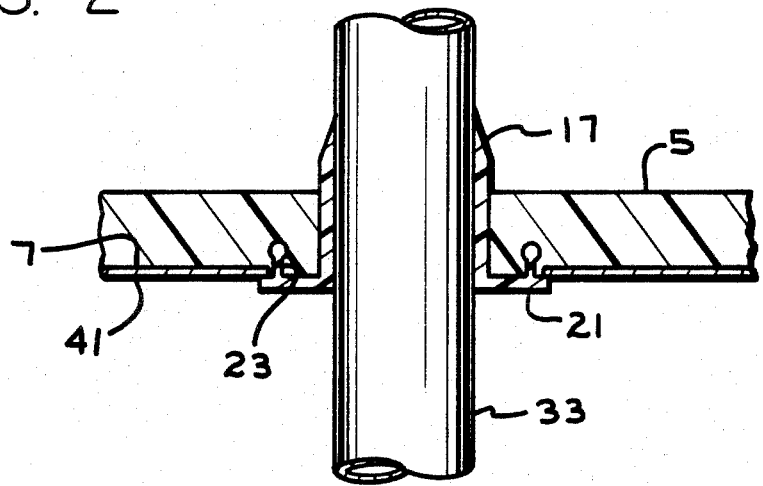

HEAT EXCHANGER SEAL

BACKGROUND OF THE INVENTION

This invention relates to an annular seal which is secured in a member in a manner to form a fluid tight joint between the seal and the member. More particularly the invention relates to a tube sheet member and an annular seal for a tube-type heat exchanger that is to be used in caustic environments. The heat exchanger tubes are positioned in the opening of the annular seal which are positioned in the tube sheet member.

Heat exchangers have been used for many years to recover heat from various industrial processes. In particular, tube-type heat exchangers have been frequently used as the mechanism to recover heat from industrial processes. A tube-type heat exchanger has a tube sheet with a plurality of apertures located therein. A heat exchanger tube is then inserted into and supported by the apertures in the tube sheet. Normally, a seal is positioned in the aperture in the tube sheet to form a fluid tight seal between the tube sheet and the heat exchanger tube. Usually, the tube sheet and the heat exchanger tube are formed of metal or other similar material having good thermal characteristics for transferring heat.

In operation hot fluids from an industrial process pass through the heat exchanger and come into contact with the heat exchanger tubes. The hot fluids from the industrial process heats the fluid in the heat exchanger tubes and allows a portion of the heat from the industrial process to be recovered.

In many industrial applications the hot fluid from the industrial process is extremely caustic. The caustic nature of the hot fluid severely limits the applications where heat exchangers can be used to extract heat that is otherwise normally lost.

Attempts have been made to develope a tube-type heat exchanger that can operate in such caustic environments to expand the applications where heat can be recovered from hot fluids produced by industrial processes. However, it is extremely difficult to provide a seal for the heat exchanger tubes that can accommodate expansion and contraction of the tube without leakage of the caustic fluids. It is also difficult to form a seal or joint between the annular seals for the heat exchanger tubes and the aperture of the tube sheet. If fluid leaks between the seal and the aperture in the tube sheet the caustic fluid can damage areas of the heat exchanger that are not designed to handle this caustic material.

In prior art heat exchangers a liner that can resist the caustic fluids is positioned on the surface of the tube sheet. The liner protects the metal tube sheet from the caustic fluids. However, it is difficult to form a fluid tight seal or joint between the liner and the seals for the heat exchanger tubes. It is also difficult to form a fluid tight seal or joint between the liner and the apertures in the tube sheet. Frequently, when a liner is used there is leakage or seepage between the liner and the annular seals or the apertures in the tube sheet. Such leakage can cause serious damage to the components of the heat exchanger.

Accordingly, it is desirable to have a seal for the tubes used in a tube-type heat exchanger to prevent the leakage of caustic material between the seal and the aperture in the tube sheet and that can also form a fluid tight seal with the heat exchanger tube.

SUMMARY OF THE INVENTION

According to the invention there is provided a seal having a member of castable material. The member has a first surface and second surface and at least one aperture formed in the member during the casting of the member. A seal is positioned in the aperture in the member. The seal is positioned in the aperture during the casting of the member whereby the seal is secured to the members castable material and forms a fluid tight joint with the first surface of the member.

There is also provided according to the invention a seal for a heat exchanger. A tube sheet member of castable material is provided and the member has a first surface and a second surface. The member has at least one aperture formed in the member during the casting of the member. A resilient annular seal is positioned in the aperture in the member during the casting of the member. The seal has an elongated section that is positioned in the aperture and the elongated section defines an opening. A flange is positioned on one end of the elongated section and the flange is in substantial alignment with the first surface of the member and forms a fluid tight joint with the first surface of the member. The other end of the elongated section extends beyond the second surface of the member and defines an deformable ring that coverges towards the opening in the elongated section. A heat exchanger tube is positioned in the opening in the seal. The deformable ring is deformed radially outward to accept the heat exchanger tube. The elongated section in the deformable ring engage the tube to form a fluid tight seal with the tube.

DESCRIPTION OF THE DRAWINGS

FIG. 1 is a cross-sectional view of the heat exchanger seal of the present invention.

FIG. 2 is a perspective view of the annular seal for use in a tube-type heat exchanger.

FIG. 3 is a cross-sectional view of another embodiment of the heat exchanger seal of the present invention.

DESCRIPTION OF THE PREFERRED EMBODIMENT

This invention relates to an annular seal which is secured in a member in a manner to form a fluid tight joint between the seal and the member. More particularly the invention relates to a tube sheet member and annular seal for a tube-type heat exchanger that is to be used in caustic environments. The details of the invention will be more fully understood by referring to the attached drawings in connection with the following description.

Although the fluid seal of the present invention can be used in several different applications, it is particularly useful in forming a seal between the tube sheet member and the heat exchanger tubes of a heat exchanger. To facilitate the explanation of the invention the seal will be described as used in a heat exchanger although this is not meant in any way to limit the scope of the invention.

As shown in FIG. 1, a member 5 is provided that is formed of a castable or moldable material. The member 5 is shown as being a tube sheet member which forms the end wall of a tube-type heat exchanger. The member 5 has a first surface 7 and a second surface 9. A plurality of apertures 13 are formed in the member 5 during the casting or molding of the member. The apertures normally extend all the way through the member 5 from the first surface 7 to the second surface 9. The apertures 13 are normally positioned to be substantially perpendicular to the first and second surface of the member 5.

The member 5 is formed of a material such as glass fiber reinforced plastic or other suitable material that allows the member to be cast or molded into a single piece. Hetron 197 is a specific example of a glass fiber reinforced plastic material that works particularly well in forming a tube sheet for a heat exchanger as this material is heat an acid resistant. Forming the tube sheet of Hetron 197 allows the tube sheet to be used in high temperature and caustic environments frequently encountered during the operation of a heat exchanger.

Annular seals 17 are positioned in the plurality of apertures 13 located in the member 5. The seals 17 have an elongated section 19 that is positioned in engagement with side wall of the aperture 13. Normally the elongated section 19 extends beyond the second surface 9 of the member 5. Normally the elongated section 19 will be cylindrical in shape. An opening 18 extends through the elongated section 19 of the seal 17.

A flange 21 extends from the end of the elongated section 19 that is adjacent the first surface 7 of the member 5. The flange extends in a direction substantially perpendicular to the elongated section 19 and substantially parallel to the first surface 7 of the member 5. The seal 17 is positioned in the member 5 so that the exterior surface of the flange 21 is in alignment with the first surface 7 of the member 5.

A projection 23 extends from the flange 21 in a direction that is substantially perpendicular to the flange. The projection 23 usually extends into the member 5 in a direction towards the second surface 9. The projection 23 is also substantially parallel to the side wall of the elongated section 19 of the seal 17.

A retainer 25 is positioned on the end of the projection 23 that is spaced apart from the flange 21. The retainer 25 has a cross-sectional area that is larger than the cross-sectional area of the projection 23. The retainer 25 is disposed to be embedded in the castable material of the member 5 to assist in securing the seal 17 to the member 5. As shown in the drawings, the retainer 25 has a substantially circular cross-sectional shape. However, it should be recognized that other shapes for the retainer can be used satisfactorily as long as the retainer 25 acts to secure the seal 17 to the member 5.

The end of the elongated section 19 of the seal 17 that is spaced apart from the flange 21 has a deformable ring 29 that converges towards and extends into the opening 18 defined by the elongated section 19 of the seal. The deformable ring 29 is made of the same material as the rest of the seal 17. The ring 29 is disposed for engaging a heat exchanger tube 33 that can be positioned in the annular seal 17. As shown in FIG. 3, the ring 29 is deformed when the heat exchanger tube 33 is inserted into the opening of the seal 17. The ring 29 is disposed to form a fluid tight seal with the surface of the heat exchanger tube. The ring 29 forms what is known as a floating seal as the ring maintains a fluid tight seal with the tube 33 even if the tube moves due to expansion and contraction during use. Also the opening 18 in the seal 17 is sized to snuggly engage the tube 33 and to form at least a partial fluid tight joint with the surface of the tube. The heat exchanger tube 33 is usually made of a material that can withstand a caustic environment. In practice it has been found that heat exchanger tubes made of glass work paticularly well and can withstand the high temperatures and caustic environments encountered in areas where it is desirable to locate heat recovery heat exchangers.

The seal 17 is normally formed of a resilient material that can be deformed when the tube 33 is inserted into the opening 18 in the seal 17. It is also important that the seal remain resilient during the operating conditions experienced by the heat exchanger so that a fluid tight seal is maintained. Teflon is one example of a material that can be used for the seal 17 that remains resilient and can withstand the temeratures and caustic environment experienced by a heat exchanger.

Because the seal 17 is positioned in the castable material of the member 5 during the formation of the member 5, a fluid tight seal is formed between the flange 21 of the seal and the first surface 7 of the member 5. In effect, the seal 17 becomes a part of the member 5 as the castable material is formed or molded around the seal. This prevents any fluid from getting between the member and seal and creating corrosion problems in the other components of the heat exchanger. This is particularly significant when the heat exchanger is utilized in caustic environments where a small amount of seepage can rather quickly cause deterioration of other components and particularily the metal components of the heat exchanger. The deformable ring 29 and opening 18 of the elongated section 19 of the seal 17 also provide a fluid tight seal with the heat exchanger tube 33. Thus, there is no fluid that passes through the annular opening of the seal 17. The seal with the heat exchanger tube 33 is maintained even when the heat exchanger tube and the other components of the heat exchanger vary in position due to contraction and expansion imposed by thermal loads on the heat exchanger.

The seal 17 is positioned in the member 5 during the casting or molding of the member 5. This can be accomplished by positioning the seal 17 on a mandril that is located in the mold for the member 5. The mandril is disposed to form the aperture 13 in the member. Since the seal 17 is positioned around the mandril, it will be held in the desired position during the molding or casting of the member 5. After the seal is put in position the castable material is then inserted into the mold to the desired depth. The castable material will flow around the elongated section 19 and the flange 25 of the seal. The castable material will also flow around the projection 23 and retainer 25 that extend from the flange 21. In this manner the castable material will be bonded to the material of the seal 17 and the retainer 25 will insure that the seal is securely held in position in the castable material. In most applications the surface of the flange 21 that is spaced apart from the projection 23 is in substantial alignment with the first surface 7 of the member 5. Using this technology any number of apertures 13 and seal 17 can be positioned in the member 5 during the casting or molding of the member.

FIG. 3 shows another embodiment of the present invention. In this embodiment the member 5 and seal 17 are substantially the same in function and construction as the seal and member previously described. However, in this embodiment there is a plate 41 that is positioned along the first surface 7 of the member 5. The plate 41 is a substantially inert material which is positioned on the first surface 7 of the member 5 to prevent the fluids passing through the heat exchanger from coming into contact with the material of the member 5. A material such as stainless steel can be used for the plate 41. The plate 41 acts as a barrier to prevent any possible contamination between the fluids passing through the heat exchanger and the material of the member 5. The plate 41 is normally disposed so that it will extend along the surface of the flange 21 where the projection 23 is located and the plate 41 terminates adjacent the projection 23. The plate 41 is positioned in the mold during the formation of the member 5. In this manner the plate 41 will be securely bonded to the castable or moldable material of the member 5 and a fluid tight seal will be formed between the plate 41, the member 5 and the flange 21 of the seal 17. The seal of the embodiment of FIG. 3 is made substantially in the same manner as the previously discussed seal.

Having described the invention in detail and with reference to specific materials it is understood that such specifications are only given for the sake of explanation. Various modifications and substitutions other than those cited may be made without departing from the scope of the invention as defined by the following claims.

What I claim:

1. A seal for a heat exchanger comprising:
   a member of castable material, said member having a first surface and a second surface, said member having at least one aperture formed in said member during the casting of said member;
   a seal positioned in said aperture, said seal being positioned in said aperture during the casting of said member, whereby said seal is secured to said member of castable material, said seal having an elongated section that is positioned in said aperture, said elongated section defining an opening, a flange positioned on one end of said elongated section, said flange being in substantial alignment with said first surface of said member and disposed in said first surface of said castable material, said flange forming a fluid tight joint with said first surface of said member said other end of said elongated section extending beyond said second surface of said member and defining a deformable ring that converges toward said opening in said elongated section.

2. The seal of claim 1, wherein said opening in said seal is in alignment with said aperture in said member.

3. The seal of claim 1, wherein a projection extends from said flange into said member, said projection acting to help secure said seal to said member.

4. The seal of claim 3, wherein said end of said projection that is spaced apart from said flange includes an area of enlarged cross section to assist in securing said seal to said member.

5. The seal of claim 1, wherein said member is a resinous product reinforced with a fibrous material.

6. The seal of claim 1, wherein said member is a heat and acid resistent reinforced resinous product.

7. The seal of claim 1, wherein said seal is formed of a resilient Teflon material that is heat and acid resistent.

8. A seal for a heat exchanger comprising:
   a tube sheet member of a castable material, said member having a first surface and a second surface, said member having at least one aperture formed in said member during the casting of said member;
   a resilient annular seal positioned in said aperture in said member during the casting of said member, said seal having an elongated section that is positioned in said aperture, said elongated section defining an opening, a flange positioned on one end of said elongated section, said flange being in substantial alignment with said first surface of said member and forming a fluid tight joint with said first surface of said member, said other end of said elongated section extending beyond said second surface of said member and defining a deformable ring that converges toward said opening in said elongated section;
   a heat exchanger tube positioned in said opening in said seal, said deformable ring being deformed radially outwardly to accept said tube, said opening in said elongated section and said deformable ring engaging said tube to form a fluid tight seal with said tube.

9. The seal of claim 8, wherein a projection extends from said flange into said member, said projection acting to secure said seal to said member.

10. The seal of claim 9, wherein said end of said projection that is spaced apart from said member includes a retainer member having a cross sectional area larger than the cross-sectional area of said projection.

11. The seal of claim 9, wherein said tube sheet member is a reinforced resinous material that can withstand high temperatures and a caustic environment.

12. The seal of claim 11, wherein said tube sheet member is made of Hetron 197 reinforced resinous material.

13. The seal of claim 7, wherein said annular seal is a Teflon material.

14. The seal of claim 9, wherein said heat exchanger tubes are glass and said tubes can withstand high temperatures and a caustic environment.

15. The seal of claim 9, wherein a sheet of substantially inert material is positioned on said first surface of said tube sheet member, said sheet extending under said flange of said seal, said sheet being positioned on said first surface of said tube sheet member during the casting of said tube sheet member whereby a fluid tight joint is formed between said sheet, said tube sheet member and said seal.

16. The seal of claim 15, wherein said sheet is stainless steel.

17. A seal for a heat exchanger comprising:
   a tube sheet member of a castable fiber reinforced resinous material that is temperature and acid resistant, said member having a first surface and a second surface, said first and second surfaces being in opposed and substantially parallel relationship;
   a plurality of apertures formed in said member, said apertures being formed in said member during the casting of said member, said apertures being disposed substantially perpendicular to said first and second surfaces and extending through said member;
   a resilient annular seal positioned in each of said apertures in said tube sheet member, said seal being made of a temperature and acid resistant material, said seal having an elongated section that is positioned in said aperture in said member, said elongated section defining an opening, a flange positioned on one end of said elongated section, said flange being in substantial alignment with said first surface of said member, a projection extending from said flange into said member, said projection being disposed substantially perpendicular to said flange, a retainer positioned on the end of said projection that is spaced apart from said flange, said retainer having a larger cross-sectional area than the cross-sectional area of said projection, said projection and retainer acting to secure said seal to said member, said other end of said elongated section extending beyond said second surface of said member and defining a deformable ring that converges into said opening in said elongated section, said seal being positioned in said member during the casting of said member whereby a fluid tight joint is formed between said flange and said first surface of said member to prevent fluid passing through said heat exchanger from leaking between said seal and said member;

a heat exchanger tube positioned in said opening in said elongated section of said seal, said deformable ring being deformed radially outwardly to accept said tube, said opening in said elongated section and said deformable ring engaging said tube to form a fluid tight seal with said tube to prevent fluid passing through said heat exchanger from leaking between said seal and said heat exchanger tube.

* * * * *